United States Patent [19]

Tejima

[11] Patent Number: 4,722,093
[45] Date of Patent: Jan. 26, 1988

[54] ARRANGEMENT FOR DETECTING BURSTS
[75] Inventor: Shunichiro Tejima, Tokyo, Japan
[73] Assignee: NEC Corporation, Japan
[21] Appl. No.: 791,693
[22] Filed: Oct. 28, 1985
[30] Foreign Application Priority Data
Oct. 29, 1984 [JP] Japan .................. 59-227175
[51] Int. Cl.$^4$ .............................. H04B 1/10
[52] U.S. Cl. .................... 375/75; 370/104; 329/104
[58] Field of Search ............ 375/75, 94, 95, 113; 370/100, 104, 105; 329/104

[56] References Cited
U.S. PATENT DOCUMENTS 3,878,339  4/1975  Maillet ................... 370/104
4,038,540  7/1977  Roberts ................... 375/95
4,135,059  1/1979  Schmidt ................... 370/104
4,561,099  12/1985 Atsugi et al. .............. 375/97

Primary Examiner—Robert L. Griffin
Assistant Examiner—Stephen Chin
Attorney, Agent, or Firm—Laff, Whitesel, Conte & Saret

[57] ABSTRACT

In order to detect bursts transmitted in a manner that each burst is located within an allocated time slot within each consecutive frame, the bursts are labelled in accordance with a burst time plan signal to produce a burst discriminating signal. Thereafter, information of window position and burst condition and window mode, is stored, with respect to each burst, in respective memories using the burst discriminating signal. The stored data are renewed and read out from the memories also using the burst discriminating signal. Further, the burst discriminating signal is further used to change the window mode each predetermined frames.

2 Claims, 5 Drawing Figures

ARRANGEMENT FOR DETECTING BURSTS

FIELD OF THE INVENTION

This invention relates to an arrangement for detecting burst signals at a receiver end, and more specifically to such an arrangement which is suited for use in a TDMA (Time Division Multiple Access) communications system.

BACKGROUND OF THE INVENTION

In the TDMA communications system, multiple earth stations share an identical carrier wave on a time division basis. Each earth station is allowed to transmit bursts (viz., high speed transmission of data bits) in a manner that each burst is located within an allocated time slot of each consecutive TDMA frame. The times of the bursts are carefully controlled so that no two bursts overlap.

Each burst transmitted from the earth stations usually contains, in its head portion or so-called "preamble", a fix pattern with a powerful self-correlating function. In order to detect the bursts, an arrangement provided for detecting bursts correlates a series of received signals with the fix pattern previously stored in the arrangement. Each time a definite correlation is obtained, the arrangment outputs a burst detection pulse.

A false burst detection, however, occurs due to thermal noises (for example). In order to overcome such a difficulty, it is a common practice to open, within each frame, multiple windows (or prediction gates) each of which is positioned such that the burst is received within the time duration defined by the window. Thus, the bursts detected within the window are deemed to be actual bursts and not noise.

As known, more than two kinds of windows are used in the TDMA system. For example, when a given earth station initially aquires bursts, a wide window is first used and thereafter a narrower one is employed. The narrow window is controlled in its position within a frame according to the burst position detected in the preceding frame. After the burst aquisition control is completed, another narrow window termed "burst sync window" is produced whose position is fixed within each frame.

FIG. 1 is a diagram showing a renewal time period of a window, wherein it is assumed that (a) only two earth stations A and B are involved in the communications system and (b) the station A receives one burst, within one frame, transmitted from the other station B. The station A successively monitors the receiving conditions of the bursts during a preset time period, and then determines a window mode each period T (during which the window mode thus determined is maintained).

FIG. 2 shows, in block diagram form, a known arrangement for detecting bursts in the TDMA system, in which it is assumed that a given station receives bursts from another on a one-burst within one-frame basis in a manner similar to the assumption made in connection with FIG. 1.

In FIG. 2, the signal which specifies burst positions within each frame, has already been applied, as burst time plan signal S3, from a source external of a burst position memory 80. A window generater 90 receives a window position signal S5 and generates a window signal S7 at a position determined by the signal S5. The window signal S7 has a mode which is determined by a burst condition signal S13 outputted from a burst condition decision circuit 100, and is applied to the next stage, viz., a window superimposer 20 which receives a correlation detecting signal S2 from a correlation detector 10. This detector 10 correlates the fix pattern stored therein with a received signal S1, and generates the signal S2 when a definite correlation is obtained therebetween.

The window superimposer 20 superimposes the window signal S7 and the correlation detecting signal S2, and permits the transmission of the signal S2 which occurs during the issuance of window signal S7 to pass therethrough. The output of the window superimposer 20 takes the form of a burst detecting signal S9. This signal S9 is then applied to the burst condition decision circuit 100, which counts the signals S9 to determine the burst condition (BR (Burst-Received) or BNR (Burst-Not-Received)) according to predetermined algorithms. The burst condition corresponds to the window mode one to one. The burst condition decision circuit 100 applies the output thereof (viz., S13) to the window generator 90 each period T. On the other hand, the window generator 90 continues to generate the same windows until the burst condition signal S13 changes.

The prior art discussed hereinabove with reference to FIGS. 1 and 2, is an oversimplified example in that there exists only one burst within each frame. However, in practice a plurality of bursts (the number of which is assumed N) is contained in one frame, in the cas of which the arrangement becomes complex and causes an increase in the number of circuit blocks (as shown in FIG. 3).

FIG. 3 shows, in block diagram form, a known arrangement for burst detection in the case where one frame contains N bursts. It should be noted that like blocks are denoted by like numerals and that some blocks bear suffixes (1 through N)) in this Figure as well as the arrangement shown in FIG. 2.

The arrangement shown in FIG. 3 is essentially identical to that shown in FIG. 2 except that the former arrangement includes N blocks $99_1$ through $99_N$ (each of which is identical to a block 99 shown in FIG. 2) and a switch 110. In this Figure, the window position signal S5 is applied to the switch 110 which in turn applies the receive signals to the window generators $90_1$ through $90_N$ in the chronological order of the burst within a frame. On the other hand, the correlation detecting signal S2 is applied to the window superimposers $20_1$ through $20_N$. Each of the blocks $99_1$ through $99_N$ operates in the same manner as described with the FIG. 2 arrangement and hence further discussion will be omitted for brevity.

As will be apparent from FIG. 3 the illustrated arrangement has encountered the drawback that it becomes bulky, complex and expensive with the number of the bursts to be detected per frame. In general, in the TDMA communications system, it is necessary to detect up to several tens of bursts in one frame and hence tends to render the circuitry involved very complex.

SUMMARY OF THE INVENTION

It is therefore a primary object of the present invention to provide an improved arrangment for detecting bursts in a communications system, which enables a relatively simple circuit to be used irrespective of the number of bursts which occur per frame.

The object is fulfilled by labelling the bursts in accordance with a burt time plan signal to produce a burst discriminating signal. Thereafter, information of window position and burst condition and window mode, is stored, with respect to each burst, in respective memories using the burst discriminating signal. The stored data are renewed and read out from the memories also using the burst discriminating signal. Further, the window mode is changed by the burst discriminating signal each predetermined frames.

An aspect of this invention takes the form of an arrangement for detecting bursts in a communications system, which arrangement includes: a correlation detector for producing a correlation signal by correlating an incoming signal with a predetermined pattern; a window superimposer for generating a burst detection signal by superimposing the correlating signal on a window; first means for labelling the bursts according to burst time plan signal applied to the arrangement, the first means producing a burst discriminating signal; second means for storing a burst position signal indicating the position of each of the bursts according to the burst time plan signal such that each burst is specified by the burst discriminating signal; third means for storing burst information of each of the bursts by referring to the burst discriminating signal; fourth means for storing the window mode of each of the burst in accordance with the burst discriminating signal; fifth means for receiving the window mode and the burst information to determine the latest window mode by referring to the burst discriminating signal, the fifth means applying the latest window mode to the fourth means to renew the window mode stored therein; sixth means for generating a window at a position specified by the burst position signal applied from the second means using the window mode, the window being applied to the window superimposer; and seventh means, supplied with the correlation signal and the window mode and the burst discriminating signal, for generating information which is used to renew the content of the third means.

BRIEF DESCRIPTION OF THE DRAWINGS

The features and advantages of the present invention will become more clearly appreciated from the following description taken in conjunction with the accompanying drawings in which like blocks, circuits or signals are denoted by like reference numerals and in which.

DETAILED DESCRIPTION OF THE PREFERRED EMBODIMENTS

Figure 1:
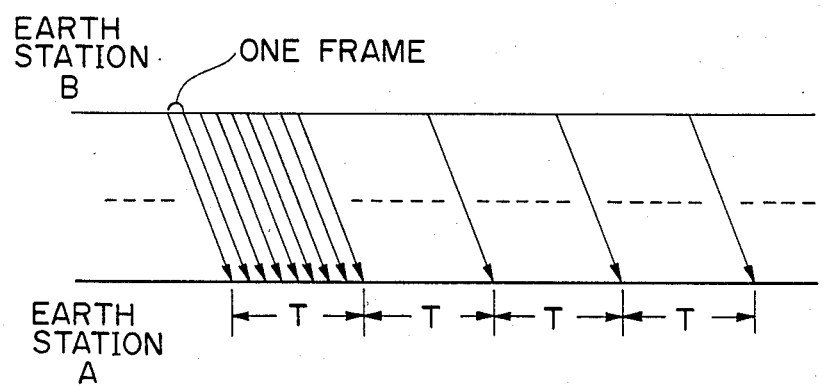
FIG. 1 is a diagram showing a renewal time period of a window for explaining the arrangement shown in FIG. 2.
Figure 2:
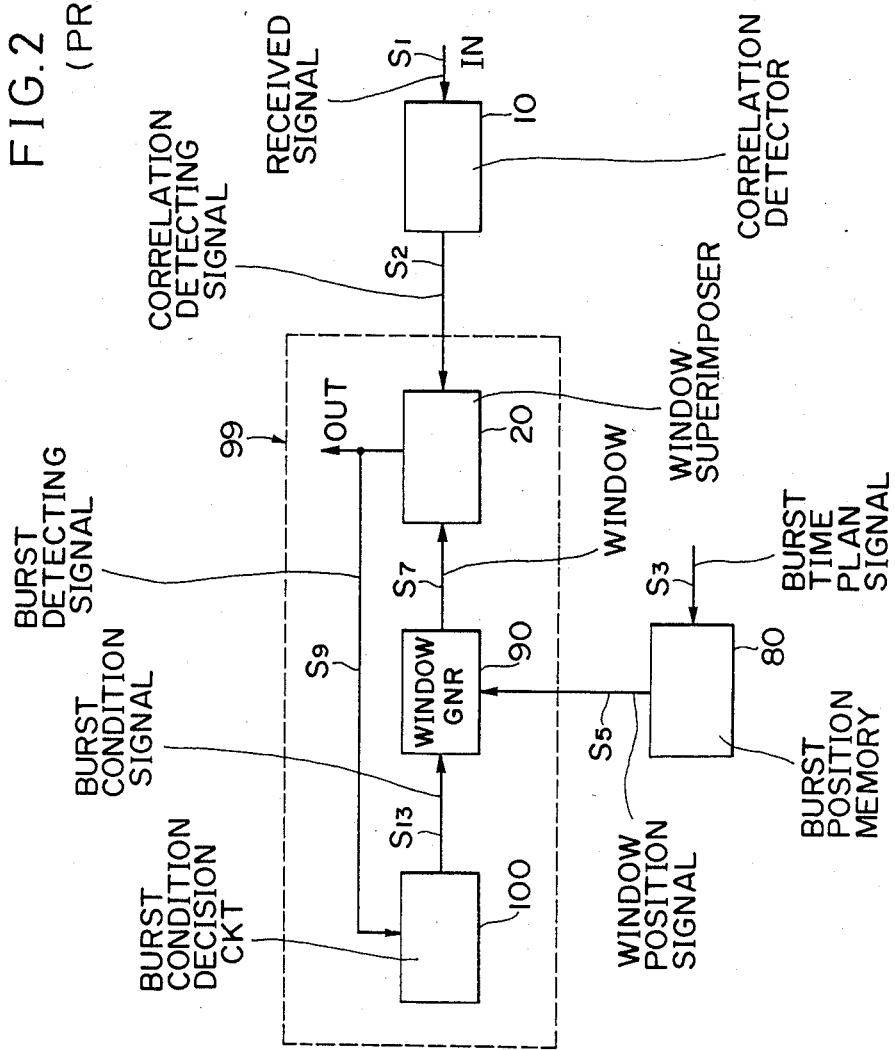
FIG. 2 shows, in block diagram form, a known arrangement for detecting the bursts transmitted from one earth station to another and wherein one burst is transmitted per frame.
Figure 3:
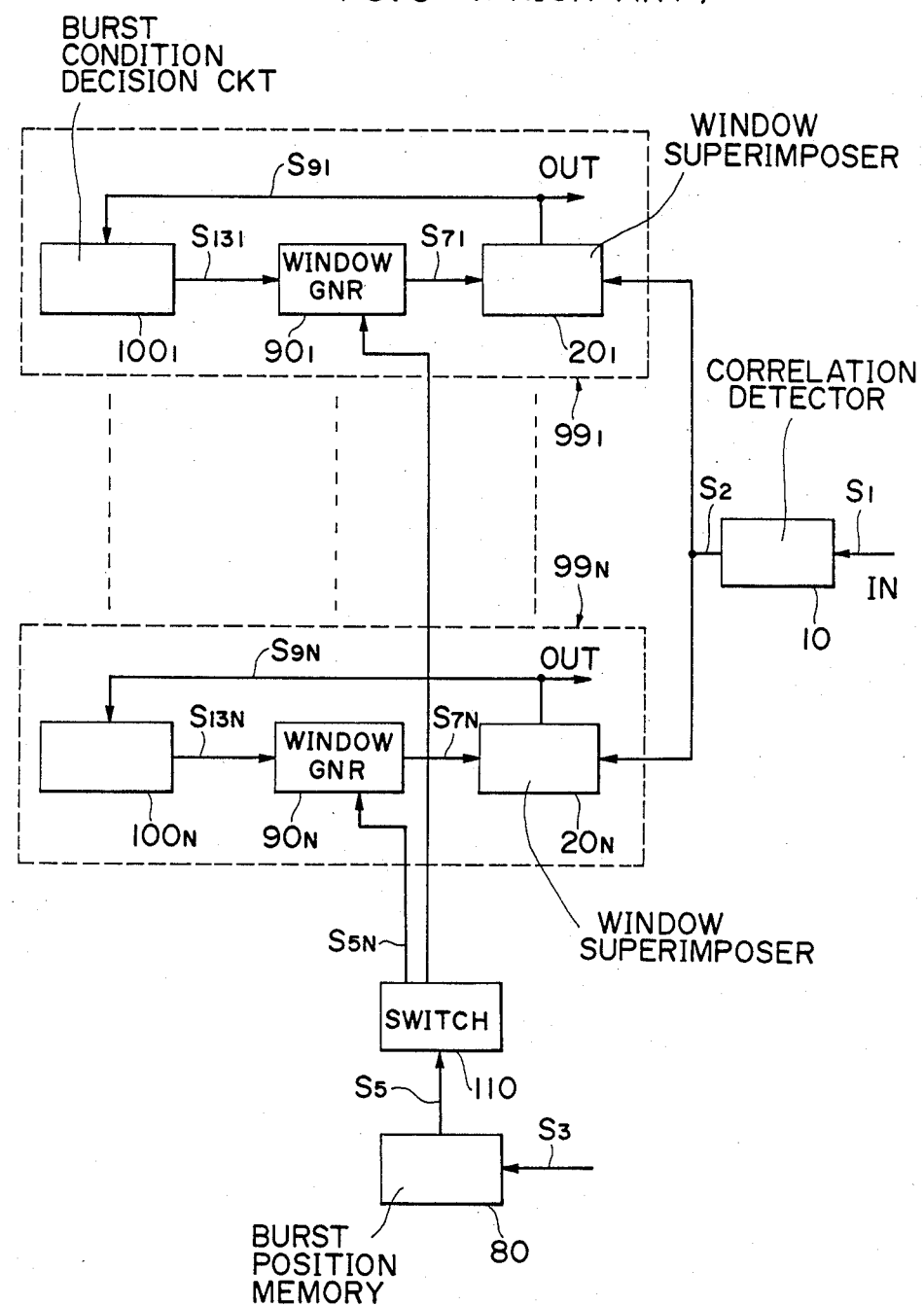
FIG. 3 shows, in block diagram form, another known arrangement for detecting the bursts transmitted from multiple earth stations.
Figure 4:
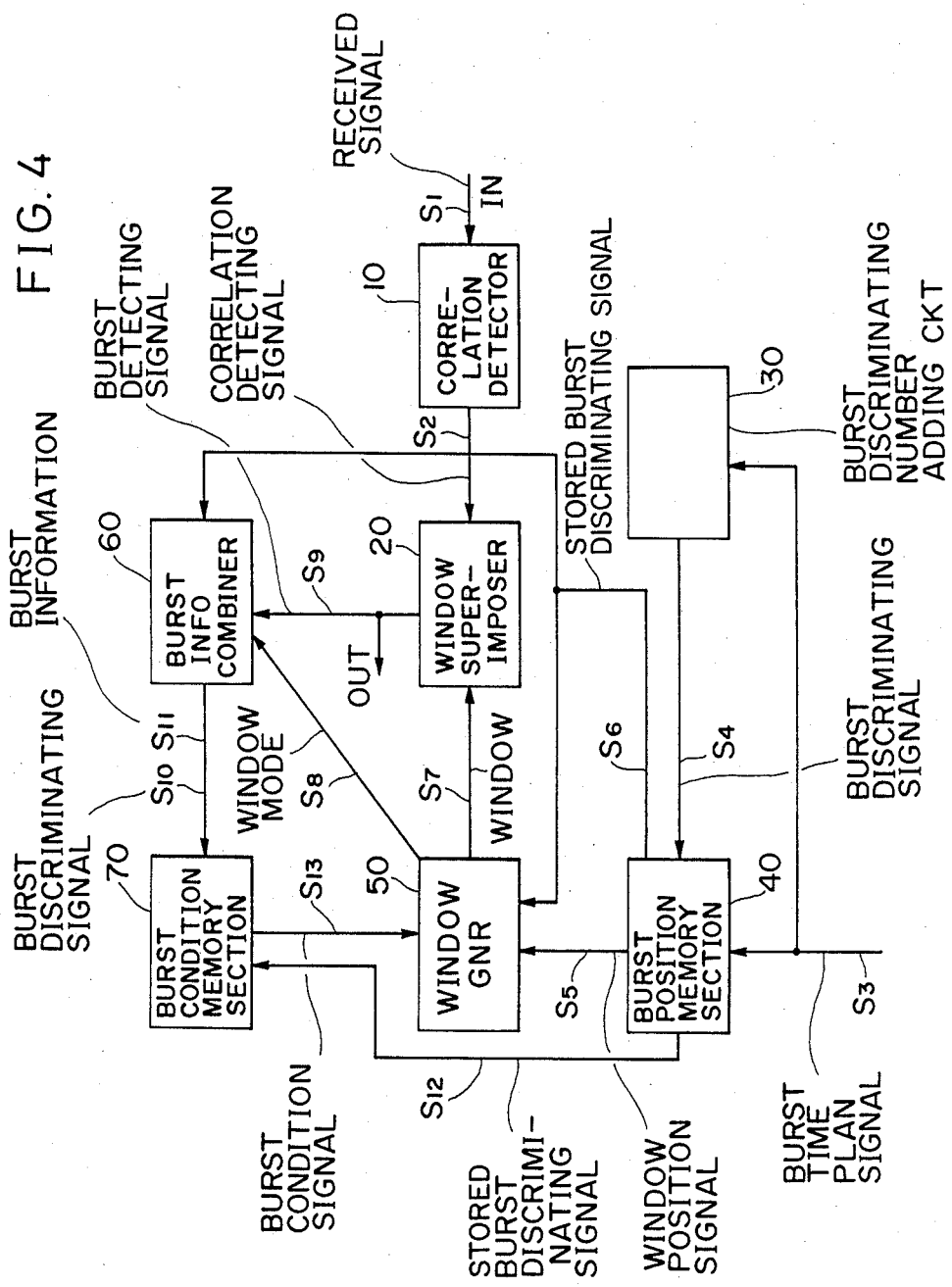
FIG. 4 is a block diagram of the arrangement for detecting the bursts in the TDMA communications systems according to this invention.

FIG. 4 illustrates, in simplified form, an embodiment of this invention. As shown, this embodiment generally comprises, the correlation detector 10, the window superimposer 20, a burst discriminating number (or burst sign) adding circuit 30, a burst position memory section 40, a window generator 50, a burst information combiner 60 and a burst condition memory section 70, all of which are coupled as shown. Various signals S1 through S13 appear in FIGS. 4 and 5, and are labelled in FIG. 4 for ease of understanding.

An important feature of this invention comes in that (a) the bursts are discriminated or labelled in accordance with the burst time plan signal in order to store the information of window position and burst condition and window mode in respective memories using a burst discriminating signal, the stored data being renewed and read out from the memories also using the discriminating signal and (b) the window mode is changed by the burst discriminating signal each predetermined frames.

Figure 5:
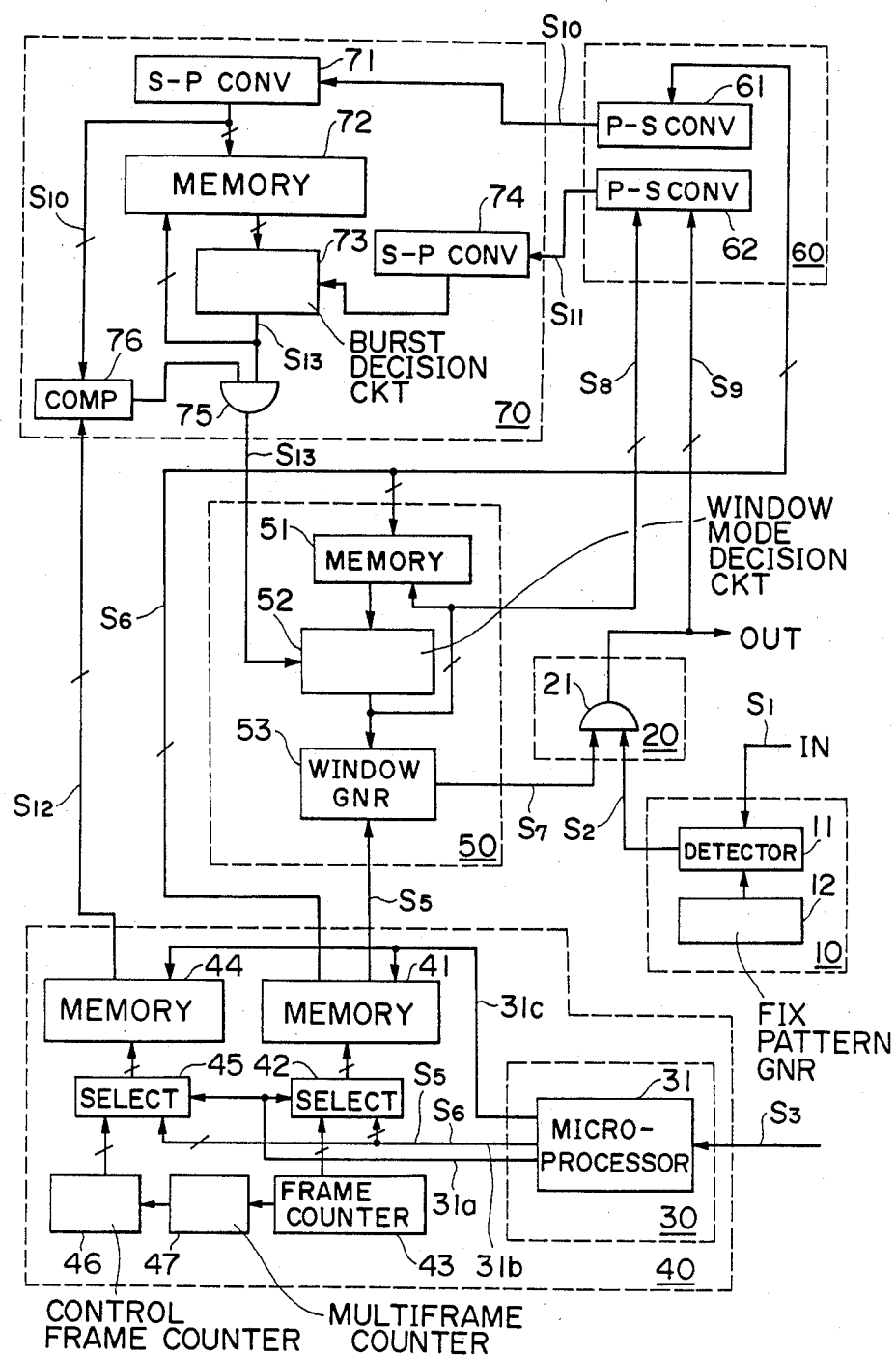
FIG. 5 shows, in block diagram form, a detailed circuit configuration of the FIG. 4 arrangement.

Hereinlater, this invention will be described in detail with reference to FIG. 5 wherein the burst discriminating number adding circuit 30 takes the form of a microprocessor 31 which is shared with the burst position memory section 40. The burst position memory section 40 in this embodiment includes two memories 41 and 44, two selectors 42 and 45, and three counters 43, 46 and 47.

The microprocessor 31 is supplied with the burst time plan signal S3, and (a) labels each burst with a burst discriminating signal S6 and (b) produces a window position signal S5 which determines the window position to be generated with respect to each burst.

The microprocessor 31 instructs, over a line 31a, the selector 42 to be coupled thereto to write, over a line 31b, the signals S5 and S6 into the memory 41 in the chronological order of occurrences in a frame, wherein the write-address signals are applied via a line 31c.

Similarly, the microprocessor 31 instructs, over the line 31a, an address bus selector 45 to be coupled thereto. Thereafter, the memory 44 stores the burst discriminating signal S5 therein according to the write-address signals applied thereto via the line 31c.

After the above-mentioned signals S5 and S6 are stored in the memories 41 and 44, the selectors 42 and 45 are respectively steered to the frame counter 43 and the control frame counter 46 under the control of the microprocessor 31, which condition is maintained until the next burst time plan signal S3 is applied.

The frame counter 43 counts up in synchronism with the frames, while the multiframe counter 47 counts up by one each time the frame counter 43 counts up by the number of frames corresponding to one multiframe. The control frame counter 46 counts up the number of multiframes. The output of the frame counter 43 is an address signal by which the contents of the memory 41 (viz., the signals S5 and S6) are successively read out and applied to the window generator 50. On the other hand, the output of the control frame counter 46 is used to retrieve the burst discriminating signal S6 every one multiframe from the memory 44. Consequently, though the output of the memory 44 is also the burst discriminating signal it is labelled S12 rather than S6 in order to clarity it functionally from signal S6.

The window generator 50 includes a memory 51, a window mode decision circuit 52 and a window generating circuit 53. The memory 51 has previously stored the window mode of each burst of a preceding frame by using the burst discriminating signal S6 as writing address signals.

The operational steps executed by the window generator 50 will now be described with respect to a given burst which is expected to be received and for which a window should be prepared. For ease of understanding the expected burst is labelled "A".

If the memory 51 is supplied with the burst discriminating signal S6 assigned to the burst "A", the memory 51 outputs the window mode previously stored therein using the applied signal S6 as a readout address signal. It should be noted that the window mode thus read out is that of the burst within the preceding frame and corresponding to the burst "A". In the event that the frame including the burst "A" is the frame at which the window mode should be changed, the burst condition signal S13 is applied to the window mode decision circuit 52 from the burst condition memory section 70. Thus, the window mode decision circuit 52 determines the new window mode according to the signal S13.

This is to say, if the frame including the burst "A" does not correspond to the frame at which the window mode should be changed, the signal S13 is blocked by an AND gate 75. As a consequence, the window mode of the burst "A" will remain unchanged.

The window mode (new or old) from the circuit 52 is then applied to the window generating circuit 53, which produces the window signal S7 at the position specified by the window position signal S5. The window signal S7 thus generated is applied to the window superimposer 20 which is an AND gate 21 in this embodiment. On the other hand, the window mode outputted from the circuit 52 is written into the memory 51 to replace the old one, and will be read out at the next window decision operation.

The received signal S1 is applied to the correlation detector 10 which includes a correlation detecting circuit 11 and a fix pattern generator 12. The circuit 11 correlates the received signal S1 with the fix pattern applied from the generator 12, and, in the event that a definite correlation is obtained, the correlation detecting signal S2 is applied to the AND gate 21.

The correlation detecting signal S2 is superimposed on the window signal S7 at the window superimposer 20. More specifically, the AND gate 21 transmits the signal which occurs within the duration of the window signal S7. The signal S2 is derived, as the burst detecting signal S9, from the output terminal of the AND gate 21, and then is applied to the burst information combiner 60.

As shown, the burst information combiner 60 includes two parallel-to-serial converters 61 and 62. The converter 61 receives the burst discriminating signal S6 in parallel, and converts same into a corresponding serial signal (viz., the burst discriminating signal) S10. On the other hand, the converter 62 is supplied with the burst detecting signal S9 as well as the window mode signal S8, and converts them into a corresponding serial signal, viz., the burst information S11. The series signals S10 and S11 are respectively fed to serial-to-parallel converters 71 and 74, which form part of the burst condition memory section 70.

This section 70, in addition, includes a memory 72, a burst condition decision circuit 73, an AND gate 75 and a comparator 76. The memory 72 has previously stored the detected information of individual bursts, and also stored the individual burst conditions which have been determined in the preceding frame. The contents of the memory 72 are read out using the signal S10 as the readout addresses, and are applied to the burst condition decision circuit 73. This circuit 73 renews the contents derived from the memory 72 by the burst information S11. The renewed or latest contents are stored in the memory 72 at the same memory position from which the old ones have been read out, respectively.

The comparator 76 compares the burst discriminating signals S10 and S12, and upon coincidence, applies a coincidence signal to the AND gate 75. Consequently, the AND gate 75 permits the burst condition signal S13 to be applied to the window mode decision circuit 52. On the contrary, if the signals S10 and S12 do not coincide, then the burst condition signal S13 is blocked at AND gate 75.

As understood from the foregoing, according to this invention, the bursts are labelled or numbered to be discriminated. The burst discrimination enables the window position, burst condition and window mode to be stored, with respect to each burst, in blocks 40, 70 and 50, respectively. Further, the window mode is selected by the burst discriminating signal each predetermined time period.

The foregoing description shows only preferred embodiments of the present invention. Various modifications are apparent to those skilled in the art without departing from the scope of the present invention which is only limited by the appended claims.

What is claimed is:

1. In an arrangement for detecting bursts in a communications system, which arrangement includes a correlation detector for producing a correlation signal by correlating an incoming signal with a predetermined pattern and further includes a window superimposer for generating a burst detection signal by superimposing the correlating signal on a window;

first means for labelling the bursts according to burst time plan signal applied to the arrangement, said first means producing a burst discriminating signal;

second means for storing a burst position signal indicating the position of each of the bursts according to said burst time plan signal such that each burst is specified by said burst discriminating signal;

third means for storing burst information of each of the bursts by referring to a stored burst discriminating signal derived from said second means;

fourth means for storing the window mode of each of the burst in accordance with said stored burst discriminating signal;

fifth means for receiving said window mode and said burst information to determine the latest window mode by referring to said stored burst discriminating signal, said fifth means applying said latest window mode to said fourth means to renew the window mode stored therein;

sixth means for generating a window at a position specified by said burst position signal applied from said second means using said window mode, said window being applied to said window superimposer; and seventh means supplied with said correlation signal and said window mode and said burst discriminating signal for generating information which is used to renew the content of said third means.

2. An arrangement as claimed in claim 1, wherein said first means takes the form of a microprocessor, and
wherein said second means includes first and second memories, a first counter for counting up the number of frames, a second counter for counting up the number of multiframes, a first selector for selectively connecting one of said first means and said first counter to said first memory, and a second selector for selectively connecting one of said first means and said second counter to said second memory.

* * * * *